(12) United States Patent
Rigollet et al.

(10) Patent No.: US 11,674,625 B2
(45) Date of Patent: Jun. 13, 2023

(54) CLAMPING COLLAR

(71) Applicant: CAILLAU, Issy-les-Moulineaux (FR)

(72) Inventors: Nicolas Rigollet, Romorantin (FR); Fabrice Prevot, Selles sur Cher (FR)

(*) Notice: Subject to any disclaimer, the term of this patent is extended or adjusted under 35 U.S.C. 154(b) by 232 days.

(21) Appl. No.: 17/023,461

(22) Filed: Sep. 17, 2020

(65) Prior Publication Data

US 2021/0088162 A1   Mar. 25, 2021

(30) Foreign Application Priority Data

Sep. 23, 2019 (FR) .................................. 19 10485

(51) Int. Cl.
*F16L 33/035* (2006.01)
*F16B 2/06* (2006.01)

(52) U.S. Cl.
CPC .............. *F16L 33/035* (2013.01); *F16B 2/06* (2013.01)

(58) Field of Classification Search
CPC ......... F16L 33/035; F16L 21/08; F16L 23/04; F16L 51/04; F16B 2/06; F16B 7/0406; F16B 7/04
See application file for complete search history.

(56) References Cited

U.S. PATENT DOCUMENTS

| | | | | |
|---|---|---|---|---|
| 4,742,600 A | * | 5/1988 | Calmettes | F16L 33/035 24/20 R |
| 4,998,326 A | * | 3/1991 | Oetiker | F16L 33/035 24/20 R |
| 5,353,478 A | | 10/1994 | Spors | |
| 5,437,081 A | * | 8/1995 | Oetiker | F16L 33/025 24/20 R |
| 5,530,996 A | | 7/1996 | Calmettes et al. | |
| 6,052,873 A | | 4/2000 | Cuno | |
| 7,062,821 B2 | | 6/2006 | Sidaine et al. | |
| 2004/0025305 A1 | * | 2/2004 | Sidaine | F16L 33/025 24/20 EE |
| 2012/0174343 A1 | * | 7/2012 | Fouqueray | F16L 33/035 24/20 EE |

(Continued)

FOREIGN PATENT DOCUMENTS

| | | | | |
|---|---|---|---|---|
| CN | 114941643 A | * | 8/2022 | ............ F16L 23/036 |
| EP | 0627591 A1 | | 12/1994 | |

(Continued)

OTHER PUBLICATIONS

Mateo tools youtube video dated Aug. 28, 2017 "How to remove and install Clic-R clamps" https://www.youtube.com/watch?v=fWNG0qXCWJQ (Year: 2017).*

(Continued)

*Primary Examiner* — Terrell L McKinnon
*Assistant Examiner* — Ding Y Tan
(74) *Attorney, Agent, or Firm* — Jonathan W. Bingham

(57) ABSTRACT

The clamping collar comprises a metal belt carrying a protruding lug in the vicinity of a first end and a hook in the vicinity of a second end. The hook has a front wall and a common part. The wall is intended to be retained behind the lug while the hook is hooked on the lug to keep the collar in the clamped state. The common part links the front wall to the belt and has a gripping surface protruding radially outwardly and two lateral borders which extend axially on either side of the gripping surface by being radially set back from the gripping surface.

20 Claims, 5 Drawing Sheets

(56) References Cited

U.S. PATENT DOCUMENTS

2013/0212842 A1\* 8/2013 Rigollet .................... F16B 2/08
24/461
2013/0334815 A1\* 12/2013 Kayacik ................. F16L 23/08
285/420

FOREIGN PATENT DOCUMENTS

| EP | 1352192 B1 | | 7/2005 | |
|---|---|---|---|---|
| EP | 2480355 B1 | | 6/2013 | |
| FR | 0243224 A1 | \* | 3/1986 | |
| FR | 2651854 A1 | | 3/1991 | |
| FR | 0636826 A1 | \* | 2/1995 | |
| FR | 2777970 A1 | \* | 10/1999 | ............. F16L 23/04 |
| FR | 2777970 A1 | | 10/1999 | |
| FR | WO-2000075552 A1 | \* | 12/2000 | |
| FR | 3017167 A1 | \* | 8/2015 | |
| GB | 2235948 A | | 3/1991 | |
| KR | 20150003047 U | \* | 8/2015 | |

OTHER PUBLICATIONS

Machine translation of the claims for EP 2480355.

\* cited by examiner

[Fig. 1]
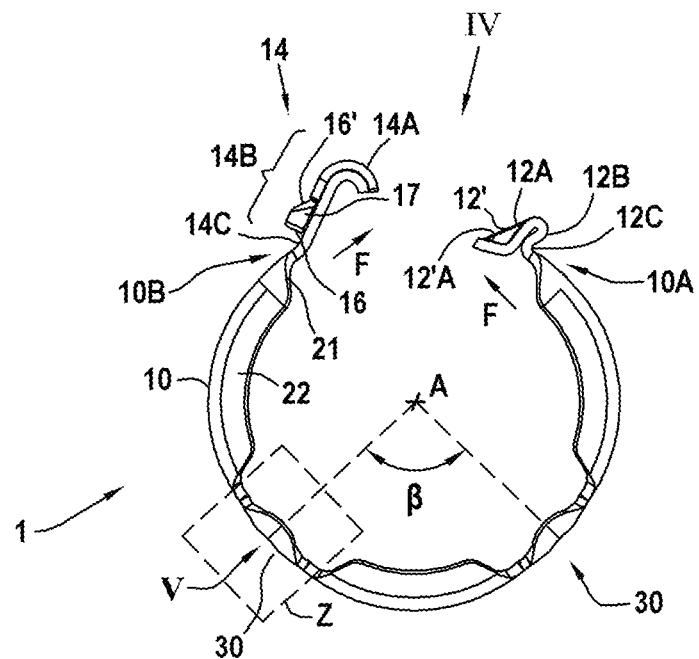
[Fig. 2]
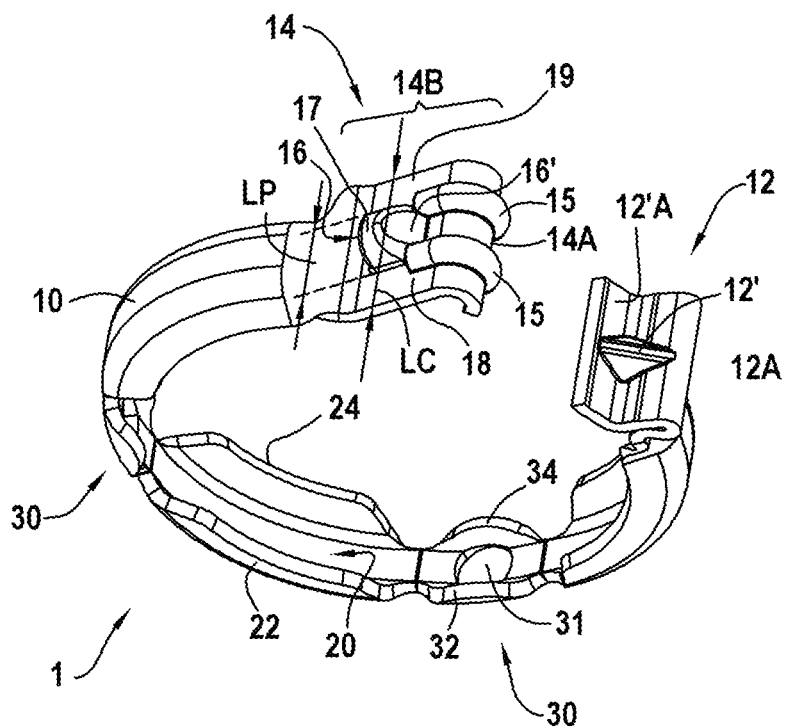

[Fig. 3]
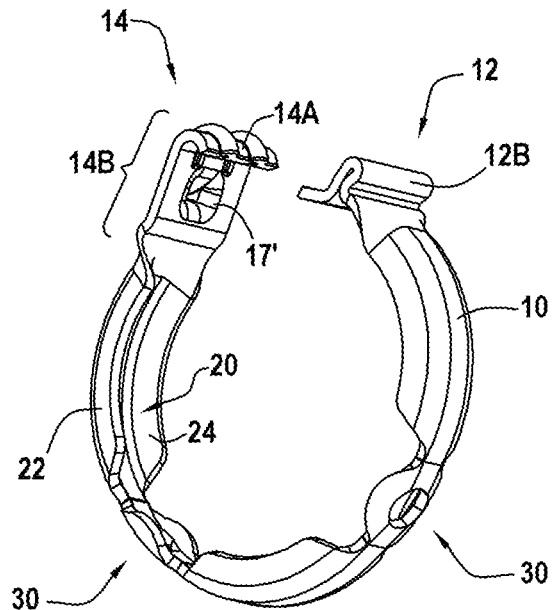
[Fig. 4]
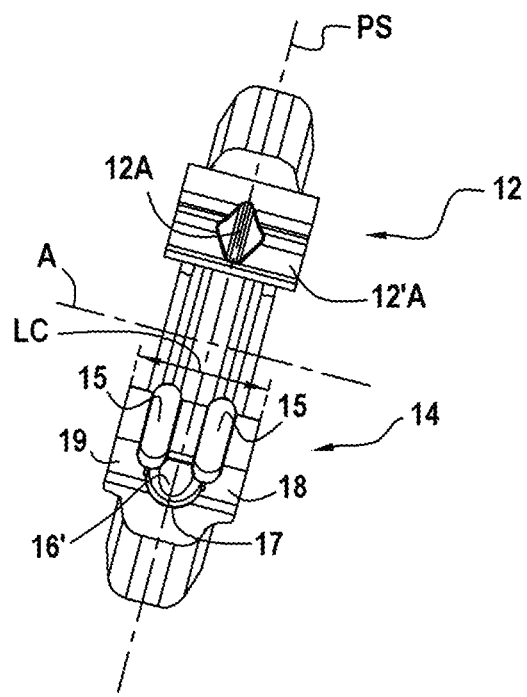

[Fig. 5]
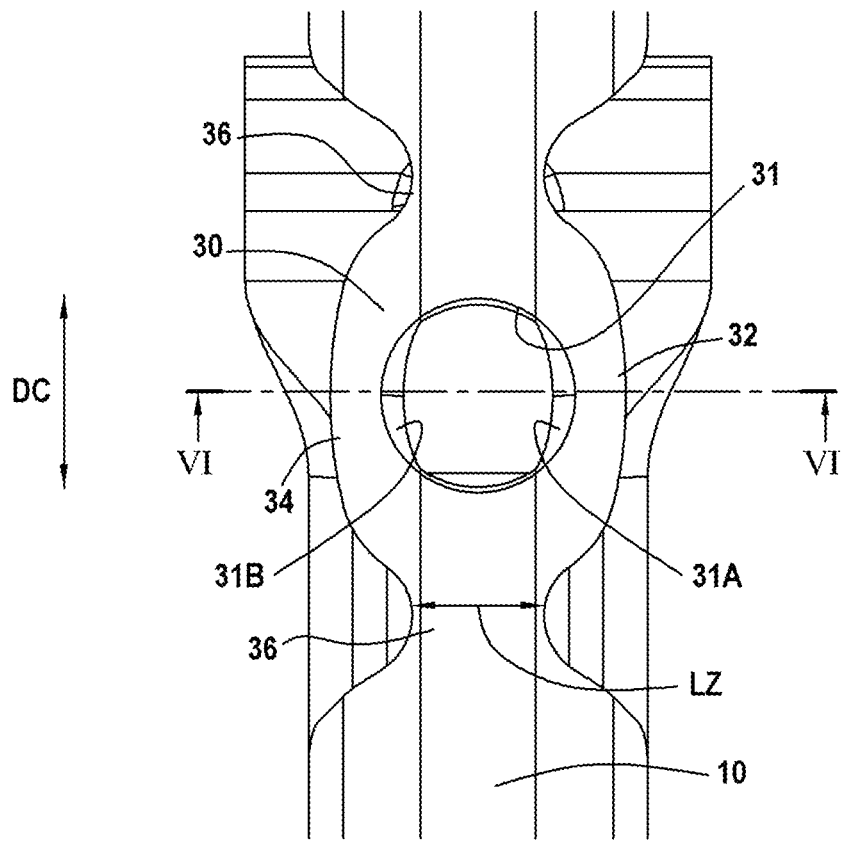
[Fig. 6]
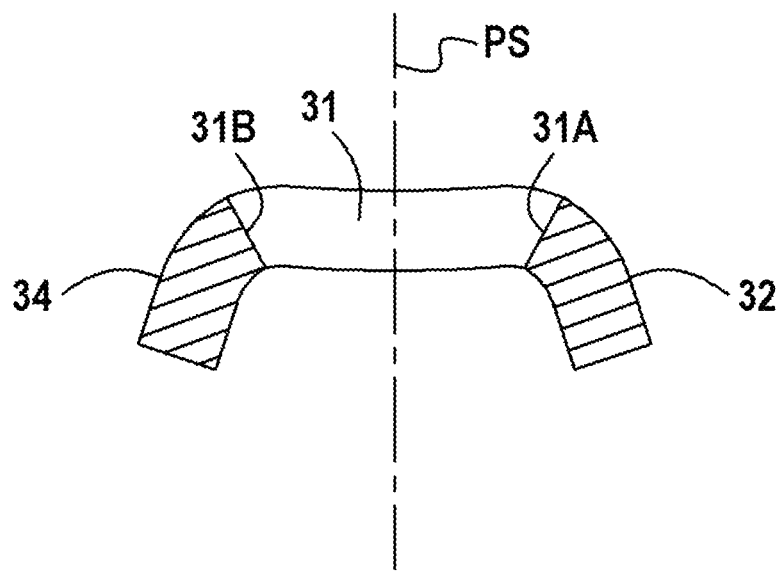

[Fig. 7]
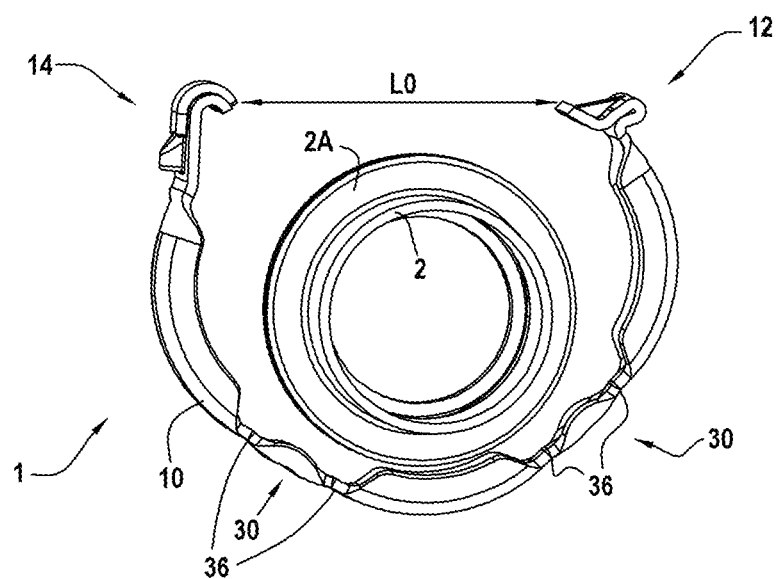
[Fig. 8]
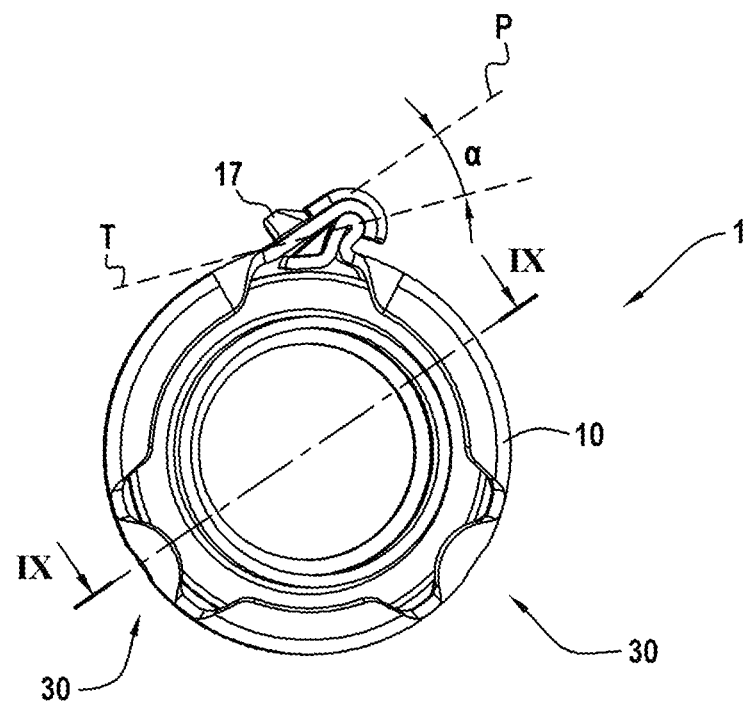

[Fig. 9]
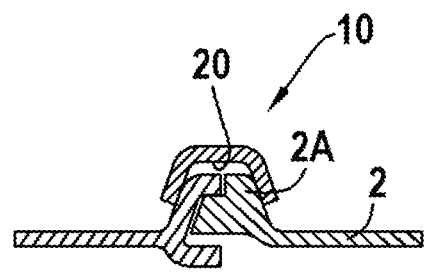
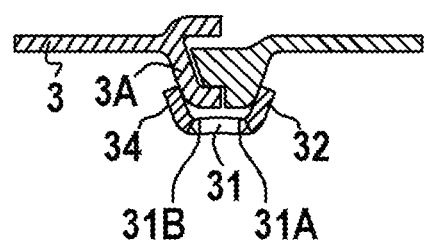

CLAMPING COLLAR

BACKGROUND

The disclosure relates to a clamping collar comprising a metal belt carrying a protruding lug in the vicinity of a first end and a hook in the vicinity of a second end.

Such a clamping collar is used to clamp an object, for example a pipe fitted on an end-piece, or two tube portions connected together end-to-end or by fitting.

The clamping collar can be used in an environment subject to significant temperature variations, for example outdoors or in the engine compartment of a vehicle or on an exhaust line of the engine of a vehicle. Collars of this type are known, for example, from patent applications EP 2 480 355, EP 0 627 591, EP 1 352 192, FR 2 777 970 or U.S. Pat. No. 5,353,478. For the clamping of such a collar, it is appropriate to use pliers or the like, one jaw of which is engaged with a rear part of the hook and another jaw is engaged with a rear part of the lug, so as to bring the hook closer to the lug until its front edge passes over the lug and hooks therebehind. Once the collar is thus closed due to this hooking, it must clamp the object around which it is disposed.

During its closure by hooking, and also while it is closed on the object it clamps, the collar is subjected to significant tensile forces. Particularly, the object clamped by the collar can be deformed, in particular due to possible thermal expansions, which can cause significant tensile forces. The collar must be able to accompany these expansions to some extent, so as to maintain the clamping without damaging the clamped object. Thus, the deformations of the object clamped by the collar can cause a local deformation of the collar, and it is important that this deformation is reversible to ensure the clamping of the collar when the object recovers its original dimensions. In the collars of the aforementioned type, the hook has a front wall intended to be retained behind the lug when the collar is closed, and a common part formed by a fold or a rear double fold, and by a top portion of the hook which extends between the rear part and the front wall.

The rear fold allows providing a gripping surface for the jaw of the hook which must bear at the rear of the latter. Thus, upon clamping, this jaw urges the hook in front of it until the front wall of the hook hooks behind the lug. However, once the collar is hooked, this rear fold can be deformed. Particularly, if the tensile forces become very significant, these deformations can assume a plastic character, that is to say they would not be reversible, which poses several problems. On the one hand, the geometry of the hook may be modified so that the hooking of the front wall behind the lug is much less ensured. This may for example be due to the fact that the deformation of the hook modifies the positioning of the front wall, particularly its radial height. On the other hand, a deformation of the rear fold of the hook generally results in an "unwinding" of this fold which increases the length of the hook. If this length increase is not reversible, the diameter of the collar is increased, and the clamping may be less ensured.

OBJECT AND SUMMARY OF THE DISCLOSURE

The disclosure aims at overcoming at least partly the aforementioned drawbacks, by proposing a clamping collar that can be easily closed by hooking the hook onto the lug and for which this hooking and the clamping resulting therefrom are maintained. More particularly, the disclosure aims at proposing a collar in which the risks of plastic deformation of the common part of the hook are limited, or even avoided. Thus, the disclosure relates to a clamping collar comprising a metal belt carrying a protruding lug in the vicinity of a first end and a hook in the vicinity of a second end, the hook having a front wall and a common part which extends rearwardly from this front wall up to an area of connection of the hook to the second end of the belt, the front wall being intended to be retained behind the lug while the hook is hooked on the lug to keep the collar in the clamped state, the common part linking the front wall to the belt and having a gripping surface protruding radially outwardly and two lateral borders which extend axially on either side of the gripping surface by being radially set back from the gripping surface, the lateral borders being linked to the end of the belt in the continuity of the latter, without radial folds outwardly and having, with respect to a plane tangent to the outer circumferential surface of the belt in the area of attachment of the hook to said circumferential surface, an inclination comprised between 5° and 60°.

Thus, in the collar according to the present disclosure, the lateral borders which are radially set back from the gripping surface extend on either side of the latter. These lateral borders behave like shrouds which counteract a deformation of the part of the hook in which the gripping surface is formed. With respect to the contour of the gripping surface, considered as an arc, the lateral borders behave like the cord of the arc and therefore prevent its deformation. On the one hand, the gripping surface forms an effective grip useful for the collar clamping tool, for example for the jaw of pliers. On the other hand, the lateral borders ensure the integrity of the shape of the hook and therefore counteracts a deformation of the latter, particularly a plastic deformation. The hook is therefore easily operated during clamping without risk of significant deformation after clamping.

Optionally, the gripping surface extends over a width comprised between 20% and 70%, optionally between 30% and 50% of the width of the common part of the hook, said widths being measured axially.

Optionally, the gripping surface is formed at the rear of a boss of the common part.

Optionally, the boss extends forwardly substantially up to the junction between the common part and the front wall.

Optionally, the boss covers a width comprised between 20% and 70%, optionally between 30% and 50% of the width of the common part of the hook, said widths being measured axially.

Optionally, the front wall has at least one stiffening rib.

Optionally, the at least one stiffening rib is linked to the front of the boss.

Optionally, the lateral borders are substantially planar.

Optionally, the belt has an inner annular recess, delimited by cheeks oriented inwardly, and the lateral borders are at least partly formed in extensions of these cheeks, which are straightened to be oriented axially.

Optionally, the lateral borders have, with respect to the plane tangent to the outer circumferential surface of the belt in the area of attachment of the hook to said circumferential surface, an inclination comprised between 10° and 40°.

Optionally, the lateral borders extend over the entire length of the common part, from the junction of the hook with the belt up to the front wall.

Optionally, the belt has at least one capacity reserve, formed by a portion of the belt likely to elongate under the effect of a clamping tension of the belt, the capacity reserve optionally having at least one concave edge portion, particularly formed on the edge of a deformable orifice.

Optionally, the belt has an inner annular recess, delimited by cheeks oriented towards the axis of the belt, and the capacity reserve has cheek portions, also oriented inwardly.

Optionally, the capacity reserve is delimited, along the circumferential direction of the belt, by hinge-forming portions.

Optionally, the hinge-forming portions are devoid of cheeks.

Optionally, the clamping collar is formed in one piece from a metal strip.

The present disclosure will be better understood and its advantages will appear better upon reading the following detailed description of one embodiment represented by way of non-limiting example.

BRIEF DESCRIPTION OF THE DRAWINGS

FIG. 1 is a side view of a collar according to the present disclosure in the open state.

FIG. 2 is a perspective view of the collar of FIG. 1.

FIG. 3 is another perspective view of the collar of FIG. 1, taken from another angle.

FIG. 4 is a top view, according to the arrow IV, of the collar of FIG. 1.

FIG. 5 shows the area Z of FIG. 1, taken along the arrow V indicated in FIG. 1.

FIG. 6 is a sectional view of FIG. 5 in the radial plane VI-VI.

FIG. 7 illustrates a possibility for placing the collar around an object to be clamped by means of the collar.

FIG. 8 shows a side view of the collar clamped on the object.

FIG. 9 is a sectional view in the plane IX-IX of FIG. 8.

DETAILED DESCRIPTION OF THE OBJECT OF THE DISCLOSURE

Referring to FIG. 1, it is seen that the clamping collar 1 has a belt 10 which, at a first end 10A, carries a lug 12 and, at a second end 10B, carries a hook 14. The collar is here represented at the open state, the hook not being hooked on the lug and the ends 10A and 10B being spaced apart. It is understood that when the collar is closed by hooking of the hook onto the lug, the belt delimits a cylindrical circumference centered on an axis A.

The lug 12 comprises in this case a double fold 12A, 12B, protruding radially outwardly with respect to the circumference of the belt and attached to the end 10A of this belt at 12C. The outer face of the front fold 12A has a stiffening rib 12' which in this case extends up to an extension 12'A of the first end 10A located forwardly beyond the lug.

The hook has a front wall 14A and a common part 14B which is attached to the second end 10B of the belt in 14C. The front wall 14A is folded inwardly, that is to say towards the axis A, so as to be able to be hooked behind the lug 12 to keep the collar in the clamped state.

Conventionally, within the meaning of the present disclosure, an element facing away from the axis A will be referred to as "outer" element and an element oriented towards the axis A as "inner" element. Knowing that, to close the collar, the hook and the lug move relative to each other in the direction of the arrows F indicated in FIG. 1, an element of the hook will be referred to as "front" element when it is located forwardly in the direction of movement of the hook towards the lug for the clamping of the collar. An element of the hook will be qualified as "rear" when it is located on the contrary rearwardly in the same direction of movement. Similarly, regarding the lug, an element will be referred to as "front" element when it is located forwardly in the direction of movement of the lug towards the hook and "rear" element when it is located rearwardly in the same direction of movement.

The common part 14B of the hook is located at the rear of the front wall 14A and extends rearwardly from this front wall up to the area of connection 14C of the hook to the second end 10B of the belt. Thus, the common part 14B connects the front wall 14A to the belt 10.

This common part 14B has a gripping surface 16 protruding radially outwardly. More specifically, considering FIG. 2, it can be seen that two lateral borders, respectively 18 and 19, are located axially on either side of the gripping surface 16. Here, "axially" means in a direction along the axis A of the belt. It can be seen that these two lateral borders are set back radially from the gripping surface 16. In this case, the gripping surface 16 is formed at the rear of a boss 17 present in the common part 14B, this boss resulting in a recess 17' on the inner face of the common part 14B of the hook, as shown in FIG. 3.

The rear surface of the boss 17 is radially raised abruptly by forming a significant angle relative to the outer surface of the common part of the hook which is located immediately at the rear of this gripping surface, so as to provide a grip for a clamping tool, for example for the jaw of pliers. On the other hand, the front part 16' of the boss is connected in a gentler slope to the outer surface of the common part of the hook which is located at the front of the boss.

While the gripping surface forms an abrupt projection relative to the surrounding surfaces, the lateral borders of the common part of the hook are linked to the end 10B of the belt in the continuity of the latter, without radial folds outwardly. In this case, the lateral borders are substantially planar. As can be seen in FIG. 8, their outer surfaces define a plane P which is inclined at an angle α with respect to a plane T tangent to the outer circumferential surface of the belt 10, at the second end 10B of the latter, in the area 14C of attachment of the hook to the belt. The angle α is comprised between 5° and 60°, optionally between 10° and 40°. For example, the angle α can be on the order of 20°. The planes P and T, as well as the angle α mentioned above are represented in FIG. 8, in the closed state of the collar, while the hook is hooked behind the lug. Conventionally, the values indicated above for the angle α are measured in this situation in which the collar is closed. The lateral borders located on either side of the gripping surface 16 counteract the deformation of this gripping surface. In this case, these lateral borders counteract the deformation of the boss 17 in which the gripping surface 16 is formed. As this gripping surface provides a bearing plane to the clamping tool, it is unnecessary to provide the hook with a fold in the area of connection 14C with the end 10B of the belt. As indicated above, this connection is made in the continuity of the circumferential surface of the belt.

The gripping surface extends over a width LP (see FIG. 2) which is comprised between 20% to 70%, optionally between 30% and 50% of the width LC of the common part of the hook, these widths being measured axially, that is to say along the direction of the axis A. Thus, the lateral borders each have a width comprised between 15% and 40% of the width LC, optionally between 25% and 40% of this width LC. For example, the width of the common part of the hook is divided into equal or substantially equal three tiers, respectively occupied by a lateral border, the gripping surface and the other lateral border. In this case, the width LP of the gripping surface is also the width of the boss 17.

These lateral borders form areas of the common part of the hook having sufficient material to provide the required mechanical strength. The boss 17, which has small dimensions, forms a work hardened area, unlikely to be deformed.

In this case, the collar is symmetrical with respect to a plane of symmetry PS perpendicular to the axis A, as seen in FIG. 4. The gripping surface 16 is located in a central region of the width LC of the common part 14B of the hook, this width being measured parallel to the axis A. It can be seen in the figures that the boss 17 extends forwardly of the hook substantially up to the junction between the common part 14B and the front wall 14A.

In this case, the front wall 14 of the hook has at least one stiffening rib 15. In this case, this front wall has two stiffening ribs 15 located on either side of the plane of symmetry PS. It can be seen that the stiffening ribs 15 are linked to the front of the boss 17. Indeed, the front part 16' of the outer surface of the boss naturally attaches to the ribs 15. Work hardened areas are thus constituted in the hook, which counteract its deformation. The boss 17 may have a relatively small width, as has been indicated, and therefore constitutes a highly work hardened area unlikely to be deformed. The presence of the lateral borders on either side of the boss reinforces the resistance of the common part of the hook to deformation. The ribs 15 extend in this case not only on the front wall, thus constituting strongly work hardened areas counteracting the deformation of this wall, but also up to the boss, thus counteracting a deformation of the bend between the front wall and the common part of the hook. The hook is thus particularly robust. Depending on the applications, the ribs 15 might not be present and the gripping surface could be made on an element other than a boss, for example by a tab raised relative to the surface of the common part. Indeed, the gripping surface as such is stressed only during the clamping operation of the collar, when it cooperates with the clamping tool. While this gripping surface must be able to have sufficient mechanical strength to allow the closing and the clamping of the collar, it is not necessary for this resistance to be durable. However, the lateral borders ensure in the long term a mechanical strength of the common part of the hook preventing the elongation of the latter for the entire duration of maintaining the clamping on the clamped object by means of the collar.

The extension 12'A of the first end 10A of the belt was mentioned above. Depending on the applications, this extension could extend over a length greater than what is represented, for example over a length similar to that of the common part 14B of the hook so as to bridge said part inside the hook to ensure continuous bearing of the collar belt on the clamped object, even under the hook. Alternatively, it is possible to add a flange under the hook, or to produce the hook in a strip fixed to the second end of the belt, as illustrated in European patent application EP 1 352 192 to ensure such continuous bearing.

The belt of the collar could be flat, that is to say, correspond to the wall of a cylinder. However, in this case, this belt has an inner annular recess 20. For example, as shown in FIG. 9, the collar can be used to connect together two parts 2 and 3 of an object having annular protrusions 2A and 3A at their ends. It can be for example two portions of tubes 2, 3 whose ends, provided with annular protrusions, are brought against each other so that their annular protrusions can be received in the recess 20 of the collar belt.

The inner recess 20 is delimited by cheeks respectively 22 and 24 which are oriented inwardly, that is to say towards the axis A of the belt. These cheeks form the axial limits of the annular recess 20; they are folded back towards the axis A of the collar relative to the outer periphery of the belt. The recess in this case has a substantially U-shape, with a flat bottom 23, which delimits a cylindrical surface and relative to which the cheeks 22 and 24 are folded back. The recess could however have a V-shape. It can be provided, as in the example represented, that the recess has an overall U-shape, but that the cheeks, forming the branches of the U, are inclined relative to a radial plane perpendicular to the axis A, so as to diverge away from each other as they approach the axis A. Thus, the clamping of the collar on the object portions 2, 3 tends to bring the annular protrusions closer to each other 2A and 3A.

It can be seen in particular in FIG. 2 that the lateral borders 18 and 19 are at least partly formed in extensions of the cheeks 20 and 22, respectively, which are straightened so as to be oriented along the axis A. Thus, in the area 14C of connection of the rear part of the hook to the end 10B of the belt, the cheeks 20 and 22 are deformed to be brought back parallel to the axis A. These deformations constitute torsional bending areas 21 in which the material of the strip is strongly work hardened. They also contribute to the mechanical strength of the common part of the hook.

It can be seen that the lateral borders 18 and 19 extend over the entire length of the common part 14B, from the junction of the hook with the belt 10 in the rear area 14C, up to the front wall 14A.

In this case, the belt 10 has at least one capacity reserve 30 formed by a portion of this belt which is likely to elongate when the clamping tension of the belt exceeds a threshold value. In this case, two capacity reserves 30 are provided in two distinct areas of the belt. For example, these capacity reserves are angularly spaced at an angle $\beta$ on the order of 50 to 180°, for example on the order of 90°.

In this case, it can be seen particularly with reference to FIG. 5 that the capacity reserve 30 (the two reserves here being identical) has a deformable orifice 31. Under the effect of a high clamping tension, this orifice 31 can be deformed in its lengthwise direction, that is to say get larger along the circumferential direction DC of the belt 10. The edges 31A and 31B of this orifice which are opposite along the direction of the axis A, form concave edge portions which can be deformed by a decrease in their curvature (that is to say an increase in their radius of curvature) when the clamping voltage exceeds the threshold value, so that the capacity reserve elongates along the circumference of the belt. It can be seen that the capacity reserves 30 have cheek portions, respectively 32 and 34, which are also oriented inwardly, that is to say towards the axis A. These cheek portions contribute through their geometries and their dimensions to allowing the deformations of the orifice 31 to remain within the required limits. Particularly, in this case, the orientation of these cheek portions towards the axis A makes their deformations along the circumferential direction of the belt relatively difficult. The amplitude of deformation of the capacity reserve is therefore low. As seen in FIG. 6, the edges 31A and 31B of the orifice 31 which are opposite along the direction of the axis A are inclined with respect to a plane perpendicular to this axis A, for example with respect to the previously mentioned plane of symmetry PS. In this case, this is achieved by the fact that the cheek portions 32 and 34 encroach locally on these edges of the orifice 31. This inclination contributes to the fact that, under the effect of the tensions for which the collar is dimensioned, the plastic deformation limit of the capacity reserve is normally not reached.

In this case, it is seen that the capacity reserve 30 is delimited along the circumferential direction of the belt by hinge-forming portions 36. Particularly, these hinge-forming portions are devoid of cheeks. In other words, the cheeks 20 and 22 of the belt are interrupted in these hinge-forming portions, which therefore have a smaller amount of material and a width LZ (see FIG. 5) less than that of the belt. As can be seen in FIG. 7, the presence of these hinge-forming portions, which are in this case 4 in number since there are two capacity reserves 30, allows widely opening the collar to promote its placement around the object 2, 3 that it must clamp by a relative radial displacement between the collar and this object. In other words, in FIG. 7, the width LO of the unobstructed opening between the hook and the lug is here greater than the radial dimensions of the object 2, 3 and the collar can therefore be brought laterally around this object. However, this maximum opening does not harm the integrity and the mechanical strength of the collar since it is due to deformations of the latter in the hinge-forming portions. Moreover, the amount of material in these hinge-forming portions remains sufficient so that they are not easily deformable in the direction of the circumferential direction of the belt.

It is noted that the areas of the capacity reserve which border the hole 31 remain in the general geometry of the belt. Indeed, the portions of concave edges, in this case formed by the edges of the hole 31, are substantially located in the continuity of the inner surfaces of revolution of the recess (cylindrical bottom of the recess and annular inner faces of the cheeks), which allows a bearing continuity of the belt of the collar on the clamped object, even in the region of the capacity reserve. The hole only very locally interrupts this bearing continuity and this interruption is neutralized by the inner surfaces that border the hole. It can be provided that the cheek portions 32 and 34 have an initial inclination, with respect to a radial plane perpendicular to the axis A, such as the plane PS, which is slightly different from the inclination of the cheeks 22 and 24 with respect to the same plane. For example, the cheek portions 32 and 34 could be folded back towards the axis A slightly more than the cheeks 22 and 24, so as to pre-stress the capacity reserve during clamping.

In the example which has just been described, the collar is made in one piece from a metal strip.

The invention claimed is:

1. A clamping collar comprising a metal belt carrying a protruding lug in the vicinity of a first end and a hook in the vicinity of a second end, the hook comprising a front wall and a common part, said common part extending rearwardly from said front wall up to an area of connection of the hook to the second end of the belt, the front wall being intended to be retained behind the lug while the hook is hooked on the lug to keep the collar in the clamped state, the common part linking the front wall to the belt and comprising a gripping surface protruding radially outwardly and two lateral borders, said lateral borders extending axially on either side of the gripping surface by being radially set back from the gripping surface, the lateral borders being linked to the end of the belt in the continuity of the latter, without a radial fold and presenting, with respect to a plane tangent to the outer circumferential surface of the belt in an area of attachment of the hook to said circumferential surface, an inclination comprised between 5° and 60°.

2. The clamping collar according to claim 1, wherein the gripping surface extends over a width comprised between 20% and 70%, of a width of the common part of the hook, said widths being measured axially.

3. The clamping collar according to claim 1, wherein the gripping surface extends over a width comprised between 30% and 50% of a width of the common part of the hook, said widths being measured axially.

4. The clamping collar according to claim 1, wherein the gripping surface is formed at the rear of a boss of the common part.

5. The clamping collar according to claim 4, wherein the boss covers a width comprised between 20% and 70% of a width of the common part of the hook, said widths being measured axially.

6. The clamping collar according to claim 4, wherein the boss covers a width comprised between 30% and 50% of a width of the common part of the hook, said widths being measured axially.

7. The clamping collar according to claim 1, wherein the front wall has at least one stiffening rib.

8. The clamping collar according to claim 1, wherein the lateral borders are substantially planar.

9. The clamping collar according to claim 1, wherein the lateral borders have, with respect to the plane tangent to the outer circumferential surface of the belt in the area of attachment of the hook to said circumferential surface, an inclination comprised between 10° and 40°.

10. The clamping collar according to claim 1, wherein the belt has at least one capacity reserve, formed by a portion of the belt likely to elongate under the effect of a clamping tension of the belt.

11. The clamping collar according to claim 10, wherein the capacity reserve has at least one concave edge portion.

12. The clamping collar according to claim 10, wherein the capacity reserve has a deformable orifice.

13. The clamping collar according to claim 10, wherein the belt has an inner annular recess, delimited by cheeks oriented towards the axis of the belt, and the capacity reserve has cheek portions, also oriented towards the axis of the belt.

14. The clamping collar according to claim 10, wherein the capacity reserve is delimited, along the circumferential direction of the belt, by hinge-forming portions.

15. The clamping collar according to claim 14, wherein the hinge-forming portions are devoid of cheeks.

16. The clamping collar according to claim 1, formed in one piece from a metal strip.

17. A clamping collar comprising a metal belt carrying a protruding lug in the vicinity of a first end and a hook in the vicinity of a second end, the hook comprising a front wall and a common part, said common part extending rearwardly from said front wall up to an area of connection of the hook to the second end of the belt, the front wall being intended to be retained behind the lug while the hook is hooked on the lug to keep the collar in the clamped state, the common part linking the front wall to the belt and comprising a gripping surface protruding radially outwardly and two lateral borders, said lateral borders extending axially on either side of the gripping surface by being radially set back from the gripping surface, the lateral borders being linked to the end of the belt in the continuity of the latter, without radial folds outwardly and presenting, with respect to a plane tangent to the outer circumferential surface of the belt in an area of attachment of the hook to said circumferential surface, an inclination comprised between 5° and 60°, the belt having an inner annular recess, delimited by cheeks oriented inwardly, and the lateral borders being at least partly formed in extensions of these cheeks, said extensions being straightened to be oriented axially.

18. A clamping collar comprising a metal belt carrying a protruding lug in the vicinity of a first end and a hook in the vicinity of a second end, the hook comprising a front wall and a common part, said common part extending rearwardly from said front wall up to an area of connection of the hook to the second end of the belt, the front wall being intended to be retained behind the lug while the hook is hooked on the lug to keep the collar in the clamped state, the common part linking the front wall to the belt and comprising a gripping surface protruding radially outwardly and two lateral borders, said lateral borders extending axially on either side of the gripping surface by being radially set back from the gripping surface, the lateral borders extending over the entire length of the common part, from the junction of the hook with the belt up to the front wall, the lateral borders being linked to the end of the belt in the continuity of the latter, without radial folds outwardly and presenting, with respect to a plane tangent to the outer circumferential surface of the belt in an area of attachment of the hook to said circumferential surface, an inclination comprised between 5° and 60°.

19. A clamping collar comprising a metal belt carrying a protruding lug in the vicinity of a first end and a hook in the vicinity of a second end, the hook comprising a front wall and a common part, said common part extending rearwardly from said front wall up to an area of connection of the hook to the second end of the belt, the front wall being intended to be retained behind the lug while the hook is hooked on the lug to keep the collar in the clamped state, the common part linking the front wall to the belt and comprising a gripping surface protruding radially outwardly and two lateral borders, said lateral borders extending axially on either side of the gripping surface by being radially set back from the gripping surface, the lateral borders being linked to the end of the belt in the continuity of the latter, without radial folds and presenting, with respect to a plane tangent to the outer circumferential surface of the belt in an area of attachment of the hook to said circumferential surface, an inclination comprised between 5° and 60°, the gripping surface formed at the rear of a boss of the common part and the boss extending forwardly substantially up to the junction between the common part and the front wall.

20. A clamping collar comprising a metal belt carrying a protruding lug in the vicinity of a first end and a hook in the vicinity of a second end, the hook comprising a front wall and a common part, said common part extending rearwardly from said front wall up to an area of connection of the hook to the second end of the belt, the front wall being intended to be retained behind the lug while the hook is hooked on the lug to keep the collar in the clamped state, the common part linking the front wall to the belt and comprising a gripping surface protruding radially outwardly and two lateral borders, said lateral borders extending axially on either side of the gripping surface by being radially set back from the gripping surface, the lateral borders being linked to the end of the belt in the continuity of the latter, without radial folds and presenting, with respect to a plane tangent to the outer circumferential surface of the belt in an area of attachment of the hook to said circumferential surface, an inclination comprised between 5° and 60°, the gripping surface being formed at the rear of a boss of the common part, and the front wall having at least one stiffening rib, the at least one stiffening rib being linked to the front of the boss.

\* \* \* \* \*